(12) United States Patent
Rosenbaum

(10) Patent No.: US 8,515,754 B2
(45) Date of Patent: Aug. 20, 2013

(54) METHOD FOR PERFORMING SPEECH RECOGNITION AND PROCESSING SYSTEM

(75) Inventor: Walter Rosenbaum, Paris (FR)

(73) Assignee: Siemens Aktiengesellschaft, Munich (DE)

(*) Notice: Subject to any disclaimer, the term of this patent is extended or adjusted under 35 U.S.C. 154(b) by 742 days.

(21) Appl. No.: 12/755,143

(22) Filed: Apr. 6, 2010

(65) Prior Publication Data
US 2010/0256978 A1    Oct. 7, 2010

(30) Foreign Application Priority Data

Apr. 6, 2009  (EP) ................................ EP09005057
Apr. 27, 2009 (EP) ................................ EP09158858

(51) Int. Cl.
*G10L 19/14*    (2006.01)

(52) U.S. Cl.
USPC ......... 704/244; 704/231; 704/270; 704/270.1

(58) Field of Classification Search
USPC ............... 704/1–10, 257, 235, 270, 231, 233, 704/251–255, 244, 704.1; 1/1
See application file for complete search history.

(56) References Cited

U.S. PATENT DOCUMENTS

| 5,781,887 | A | 7/1998 | Juang |
| 6,421,672 | B1 * | 7/2002 | McAllister et al. ................ 1/1 |
| 7,680,661 | B2 * | 3/2010 | Co et al. ........................ 704/251 |
| 2004/0260543 | A1 | 12/2004 | Horowitz et al. |
| 2009/0110284 | A1 | 4/2009 | Lamprecht et al. |

FOREIGN PATENT DOCUMENTS

WO  2007/135137 A1  11/2007

* cited by examiner

*Primary Examiner* — Huyen X. Vo
(74) *Attorney, Agent, or Firm* — Laurence A. Greenberg; Werner H. Stemer; Ralph E. Locher

(57) ABSTRACT

A method for performing speech recognition relating to an object for the purpose of affecting automatic processing of the object by a processing system. The object carries information with at least a character string of processing information. The character string spoken by an operator is processed by way of a speech recognition procedure to generate a first result. Based on the need for more information of an element of the first result additional processing data is requested. An operator's response generates a second result. The first result is then modified to achieve consistency with the operator's response.

15 Claims, 3 Drawing Sheets

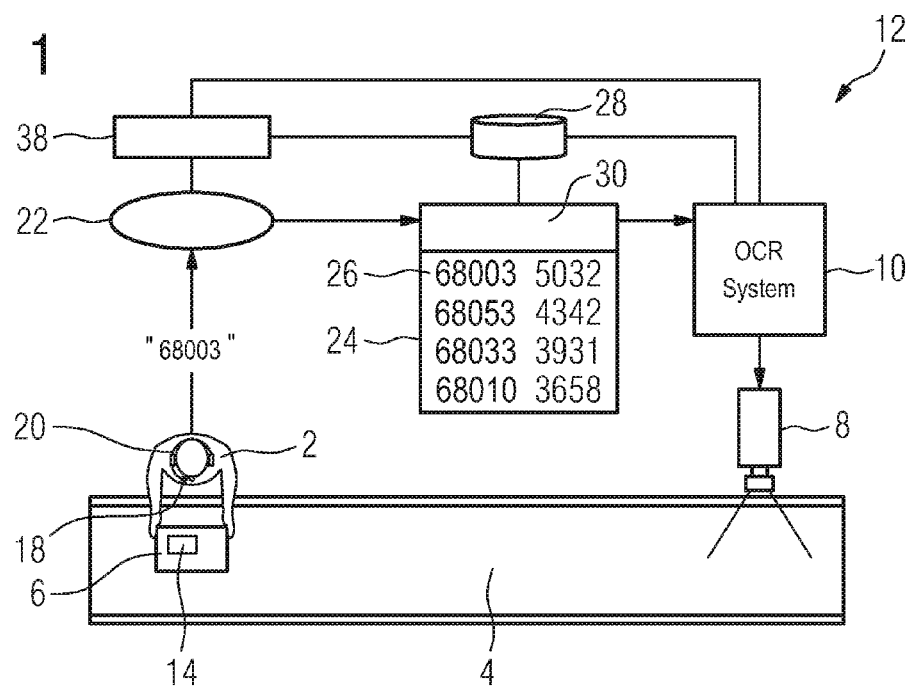
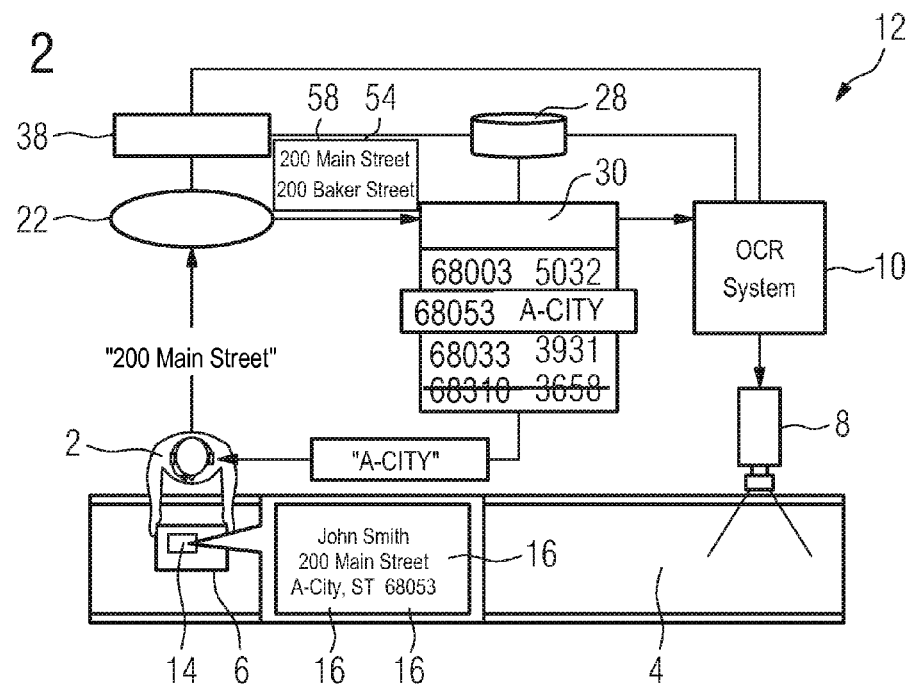

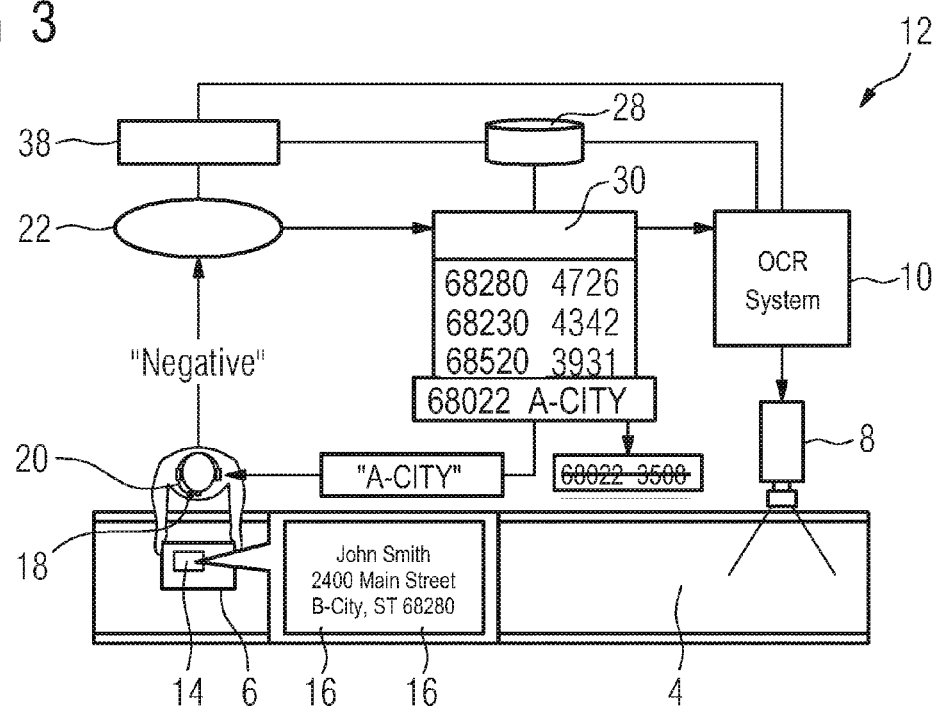

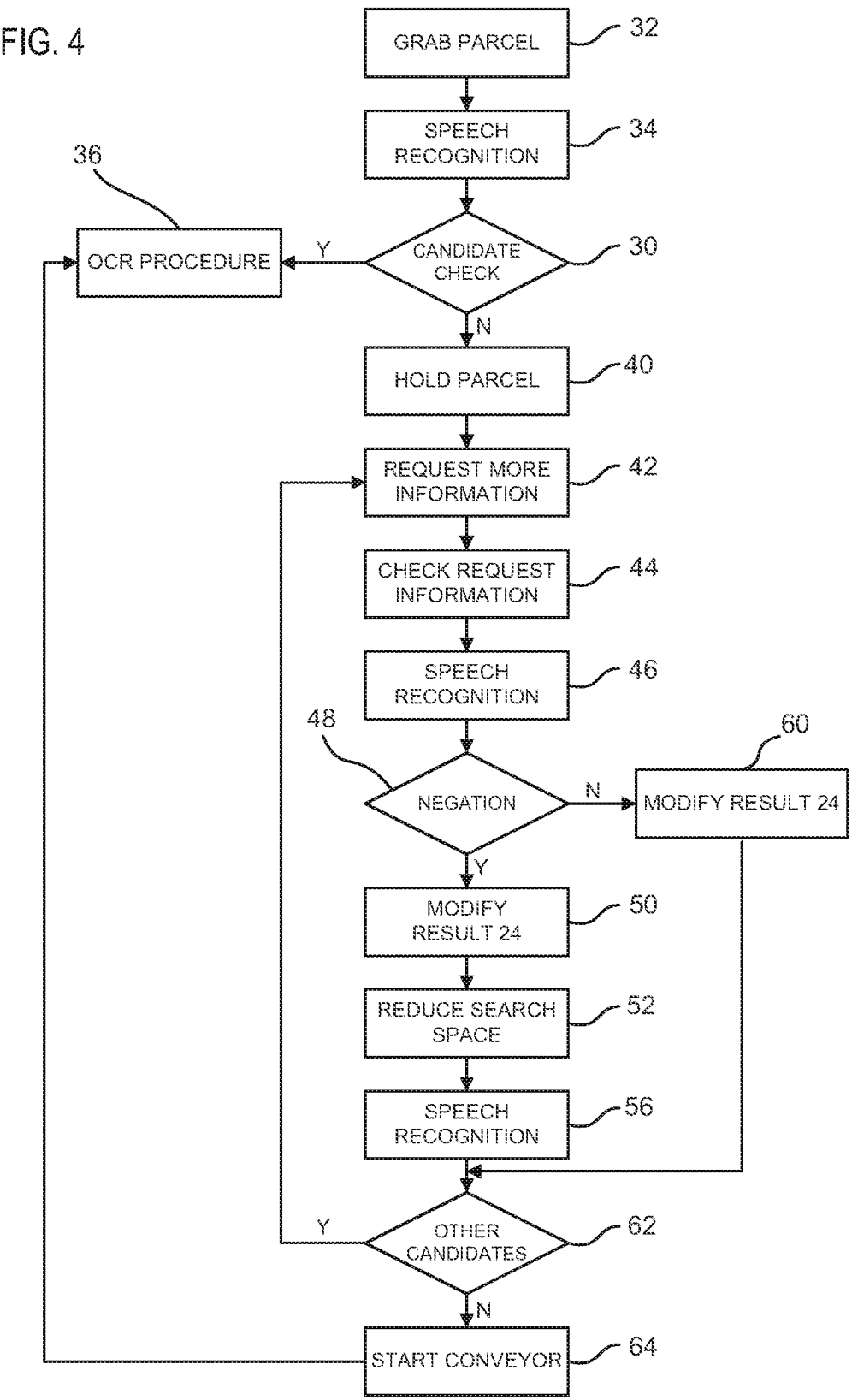

METHOD FOR PERFORMING SPEECH RECOGNITION AND PROCESSING SYSTEM

CROSS-REFERENCE TO RELATED APPLICATION

This application claims the priority, under 35 U.S.C. §119, of European patent applications EP 09 005 057, filed Apr. 6, 2009, and EP 09 158 858, filed Apr. 27, 2009; the prior applications are herewith incorporated by reference in their entirety.

BACKGROUND OF THE INVENTION

Field of the Invention

The invention relates to a method for performing speech recognition on an object for the purpose of effecting automatic processing. The invention relates further to a processing system for the automatic processing of an object.

Systems for the automatic reading of distributing information, particularly addresses, are well known in the field of mail processing. Modern OCR (optical character recognition) letter sorting equipment make it possible to achieve processing rates of ten letters per second or more. The automatic processing of parcels is more complicated due to the multitude of shapes and sizes for parcels and many possible locations of addresses on flat or round surfaces of the parcels.

To register address information on parcels it is well known to have the information spoken by an operator and to analyze the spoken words with a speech recognition system. The address so identified is sent to the sorting system processing the parcels. Unfortunately, short utterances pertaining to a country name, city or postal code, or part thereof, in particular in the context of a noisy ambient working environment, cause speech recognition processing to have diminished reliability.

In some circumstances audio feedback has been proposed where each final speech recognition result is "spoken" back to the operator using synthetic voice for them to accept before the recognition result is released for sorting. Alternatively the feedback to the operator may be via visual display. In either mode of speech recognition with feedback to the operator, where a confirmation step is required, throughput is diminished to less than half the operator voicing speed and hence the productivity is not adequate for most operations.

To solve this reliability problem a technology called Hybrid Voice introduces an OCR integral to the final speech recognition step. In a first step speech recognition generates a list of possible results from the utterance, and in a second step OCR searches for a result consistent with any result from the list to identify the intended utterance with high reliability. Hybrid Voice is described in published international patent application WO 2007/135137 A1 and its counterpart patent application publication US 2009/110284 A1.

SUMMARY OF THE INVENTION

It is accordingly an object of the invention to provide a speech recognition method and processing system which overcome the above-mentioned disadvantages of the heretofore-known devices and methods of this general type and which provides for a reliable method and system for identifying information placed on a good to be processed.

With the foregoing and other objects in view there is provided, in accordance with the invention, a method of performing speech recognition on an object for automatic processing of the object by a processing system, wherein the object includes an information area containing a character string of processing information, the method comprising:

processing a sequence of characters spoken by an operator corresponding to the character string by way of a speech recognition procedure generating a first ambiguous speech recognition result;

based on specific characteristics of the first ambiguous speech recognition result, requesting additional processing information from the operator by providing request information with the processing system;

processing an operator's response to the request for generating a second ambiguous speech recognition result; and modifying the first ambiguous speech recognition result to achieve consistency with the operator's response.

In other words, with respect to the method the objects of the invention are solved by a method for performing speech recognition on an object for the purpose of affecting automatic processing of the object by a processing system, wherein the object comprises an information area containing at least a character string of processing information. The character string spoken by an operator or a sequence of characters spoken by an operator and corresponding to the character string is processed by means of a speech recognition procedure by one or more speech recognizers to generate a first ambiguous speech recognition result. Based on specific characteristics of first ambiguous speech recognition result additional processing data is requested by giving request information by the processing system to the operator. Operator's response upon the request is processed to generate a second ambiguous speech recognition result.

According to a special embodiment of the invention the first ambiguous speech recognition result is modified to achieve consistency with the second ambiguous speech recognition result.

Of course, based on specific characteristics of first or second ambiguous speech recognition result additional processing data may be requested by giving request information by the processing system to the operator. Operator's response upon the request may be then processed to generate a third or successive ambiguous speech recognition result.

The method may be used as part of hybrid voice process using speech recognition for supporting OCR, for example to restrict the search space of the OCR process. However, the speech recognition as described may in another embodiment of the invention be used as a standalone process without OCR, especially when performed on a multi speech recognizer system. With such a system the voice message as spoken by the operator may be delivered to a plurality of voice recognition systems, each of the voice recognition systems analyzing the voice message and identifying a first ambiguous speech recognition result. This result may be evaluated in order to identify the most probable result among the first results best matching the character string of the processing information.

In case hybrid voice is used, a further step would be making a digital image of the information area available for an OCR procedure, and performing the OCR procedure on the digital image using at least a part of the modified first ambiguous speech recognition result for the OCR procedure.

The method provides for improved recognition of character strings of objects. In case of an employed OCR process such process may be performed upon and restricted to the subset of possible alternatives generated by the speech recognition procedure, which may be referred to as a voice directory of alternatives. Hence, instead of performing the OCR process on a comprehensive directory the OCR process is restricted to the voice directory of alternatives generated for the currently processed object.

In addition to known hybrid voice procedures a second ambiguous speech recognition result is available to achieve a deeper level of resolution. By this the identification of the information of the object may be rendered more reliable. A pyramiding of the first and second result allows a grading of evaluation of the results in different levels. The first result may limit result elements according to a certain parameter, such as a number of elements or elements above a given quality of match (normally a numeric value relative to a range of values) goodness score or confidence value associated with. The second result may be used to further reduce the element space generated with the first result, such as the number of elements. So both speech recognition results, although remaining ambiguous relative to their utterance, may form a logical network whereby ambiguity may be reduced while additional directory data required for address resolution is further discriminated to facilitate final resolution.

The object may be any mail item such as a letter, a parcel or a packet or inscribed information that requires resolution into character data. For the dominant application of mail processing, such mail item contains destination addresses as processing information on outer surfaces or below surface being visible through a transparent window, used by the processing system to affect efficient sorting of the mail items.

The sequence of characters spoken by the operator or the character string of processing information of the object itself may contain any alphanumeric element, such as a letter, a number, any special character, or any combination thereof. The automatic processing by a processing system may be a sorting of objects, preferably a sorting according to object destinations like addresses. The processing system is preferentially a sorting system, especially a mail sorting system.

An ambiguous speech recognition result is purposely ambiguous data such as a plurality of elements—like candidates—forming the result. Each element possesses the possibility of representing the character string. The ambiguity is caused by the plurality of elements since from the elements as such it is not clear which of the elements is a correct element.

In one embodiment, the first ambiguous speech recognition result is a candidate list generated by a speech recognition system, the candidate list comprising a plurality of candidates, at least one of which corresponds to or representing the character string, or intentionally none represents or corresponds to the character string.

The use of at least a part of the modified first ambiguous speech recognition result may be done by restricting the search space of the OCR procedure to the elements of the modified first ambiguous speech recognition result. Another more extensive procedure would be to determine if a character string recognized by the OCR procedure corresponds to or is the same as an element of the modified first ambiguous speech recognition result.

In some cases the processing system requests additional processing information from the operator. This request is based on specific characteristics of first ambiguous speech recognition result. If for example, an element of the first result, such as a candidate, requires more information to enable proper sorting of the object, the request is triggered by the processing system or a controller of the processing system by giving request information to the operator. The request information may be given by synthetic voice, e.g. speaking processing information, or in any other suitable form.

Any element of the first ambiguous speech recognition result will usually be derived from a pool of possible elements stored in a data base of the processing system. Each stored element requiring more processing information for proper sorting may be tagged with information whether the element or candidate suffices alone for sorting or more information is needed.

Advantageously the request information is derived from the first ambiguous speech recognition result, the request information being different from the character string spoken by the operator, and preferably not equivalent. The request information may be processing information linked with the element of the first ambiguous speech recognition result requiring more processing information. If, for example, a ZIP code belonging to a given city, such as, say, A-City, requires more process information, such as a street name, a company name, or the like, the request information is "A-City."

The character string spoken by an operator is processing information of the object and will in the following be called first processing information. The request information is advantageously further processing information being called second processing information below.

The request information is preferably a verification request for the operator for verifying the request information by giving verification information. Operator's response or the further character string inputted by the operator as verification information is called third processing information of the object, and is processed as second ambiguous speech recognition result.

The verification information with respect to the verification request may be positive or negative. If the verification information is processing information, the second ambiguous speech recognition result may be used as positive verification information. In consequence the processing information given as request information to the operator is processed as correct. All elements of the first ambiguous speech recognition result not consistent with the request information may be deleted from the first ambiguous speech recognition result.

Furthermore, for performing the speech recognition on the operator's response the vocabulary, or in other words: the search space for all possible elements may be reduced to only those elements being consistent with the request information. Subsequently the generating of the second ambiguous speech recognition result may be done out of the restricted vocabulary.

When speech recognition on the operator's response has resulted in the second ambiguous speech recognition result all elements of the first ambiguous speech recognition result not consistent with this result may be deleted from the first ambiguous speech recognition result.

It could happen that the element of the first ambiguous speech recognition result requiring further processing information is a "wrong" element, i.e. it does not correspond to the spoken character string of the first processing information, the request information may be a city name whereas this city is not the destination city of the object.

In such case where the request information is not consistent with the processing information of the object, the operator's response could be a negation. This response may be processed as verification information as well, and the corresponding element may be removed from the prior ambiguous result.

The modifying of the first ambiguous result, like the removal of a candidate from the candidate list, is a diminishment of the ambiguity. It preferably takes place before forwarding the modified first voicing result for use in an OCR process. However, the second ambiguous speech recognition result may as well be used for supporting the OCR procedure together with the unmodified first ambiguous speech recognition result.

Preferably the first, second, third or further processing information are elements of sorting information of the object, like an address, each element being different.

With respect to the processing system, the object of the invention is solved by a processing system for affecting automatic processing of an object, wherein the object comprises an information area containing at least a character string of processing information, the processing system comprising a speech recognition system having a port configured to couple to a communication device of an operator to input at least one spoken character string. The speech recognition system is configured to generate a first ambiguous speech recognition result from the input. Further, the processing system comprises a controller coupled to the speech recognition system and the OCR system. The controller is configured to control a request of additional processing data by giving request information by the processing system to the operator. This request is based on specific characteristics of first ambiguous speech recognition result. The controller controls a processing of the operator's response upon the request to generate a second ambiguous speech recognition result.

Advantageously the first ambiguous speech recognition result is modified to achieve consistency with the second ambiguous speech recognition result.

With the above and other objects in view there is also provided, in accordance with the invention, a processing system for the automatic processing of an object, the object having an information area containing at least a character string of processing information, comprising:

a speech recognition system having a port configured to be coupled to a communication device of an operator for inputting at least a sequence of characters, said speech recognition system being configured to generate a first ambiguous speech recognition result from an input received from the communication device;

a controller connected to said speech recognition system (and, optionally, to an OCR system), the controller being configured:

based on specific characteristics of the first ambiguous speech recognition result, to control a request for additional processing data by providing request information to the operator;

to control a processing of an operator's response to the request to generate a second ambiguous speech recognition result; and to modify the first ambiguous speech recognition result to achieve consistency with the second ambiguous speech recognition result.

The processing system may be equipped with a plurality of voice recognition systems, each voice recognition system being able to analyze the sequence of characters spoken by the operator parallel to one another, and generating a first ambiguous speech recognition result in a multi speech recognizer process.

In a further embodiment the processing system is equipped with an optical character recognition (OCR) system configured to perform a OCR procedure, and coupled to receive a digital image of the information area. The controller is configured to make a digital image of the information area available for an OCR procedure, and to control a performing of the OCR procedure on the digital image using at least a part of the modified first ambiguous speech recognition result for the OCR procedure. Such system provides for recognition of character strings on objects improved in reliability.

Advantageously the controller is configured to control one, a few or all of the method steps described above.

Other features which are considered as characteristic for the invention are set forth in the appended claims.

Although the invention is illustrated and described herein as embodied in a method for performing speech recognition and processing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a schematic view of an operator at a parcel transport belt dictating a part of an address written on a parcel into a voice recognition system;

FIG. 2 is a similar view illustrating a first dialog between the operator and the voice recognition system controlled by a controller of a processing system;

FIG. 3 is a similar view illustrating a second dialog; and

FIG. 4 a flow diagram illustrating the exemplary dialog sequence.

DETAILED DESCRIPTION OF THE INVENTION

Referring now to the figures of the drawing in detail and first, particularly, to FIG. 1 thereof, there is shown a schematic view of an operator 2 at a conveyor belt 4 for transporting objects 6 (e.g., parcels) from a position as shown to a sorting system. The sorting system comprises a plurality of boxes for holding parcels, each box receiving parcels directed to a specific destination, such as postal code or ZIP code area, or more finely sorted: a district, a city section or a company. If an OCR system 10 is present, as depicted in FIG. 1, the conveyor belt 4 transports the objects 6 to a camera 8 of the OCR system 10 before transporting them to the sorting system. The conveyor belt 4, the OCR system 10 and the sorting system are part of a processing system 12 for processing the objects 6, such as sorting.

Each object 6 or packet carries an information area 14 such as a sticker with an address written or typed on it, or a transparent window showing an address underneath. Each address may contain several character strings 16 of processing information, such as a street, a ZIP code and a city, as shown in FIG. 2. This process information is used to process the objects 6, i.e. to sort the packets into the respective boxes.

The conveyor belt 4 transports the objects 6 to the operator 2. In another mode the operator 2 grasps one object 6 after the other from a transport vehicle and puts them one after another onto the running conveyor belt 6. Each time the operator 2 holds an object 6 he reads a specific character string 16 of the information area 14, for instance the ZIP code. This utterance is received by a microphone 18 of a communication device 20 and converted into an electric signal forwarded via a respective port to a voice recognition system 22. In the specific example shown in FIG. 1 the operator 2 dictates the ZIP code "68003" into the microphone 18, in some fashion based on coding rules such as voicing: "Sixty-Eight" "Zero" "Zero" "Three."

The voice recognition system 22 analyzes the utterance and generates in a voice recognition procedure a first ambiguous speech recognition result 24. The result 24 is an element list and consists of a plurality of elements, such as candidates 26 as shown in FIG. 1. The candidates 26 are picked from a large list of possible candidates stored in a database 28 together with speech recognition attributes. Each of the picked candidates 26 in the candidate list is ambiguous, since it is neither defined nor clear which of the candidates 26 is correct, there is even the possibility that none of the candidates 26 is correct.

The candidates 26 of the candidate list are then checked for unambiguousness for sorting in a candidate check procedure 30 since some of the ZIP codes are clear for sorting and others are divided into sub-areas, each sub-area being assigned to a transporting box in the sorting system. The information for performing this candidate check is stored in the database 28 containing clarity information for each candidate 26.

The procedure as described is depicted in a flow diagram in FIG. 4. In a first step 32 the operator 2 grabs a parcel, reads the predefined character string—i.e. the ZIP code—and places the packet on the conveyor belt 4. In the second step the speech recognition process 34 is performed and the first ambiguous speech recognition result 24 is generated. The candidate check 30 is the third step.

If all candidates 26 are adequate for sorting, depicted with "Y" in FIG. 4 the sorting process may be started according to the result of the speech recognition process. In case the OCR system 10 is present the process continues with the OCR procedure 36. Although this OCR procedure is useful, it is not necessary for the invention. Other methods may be used, like multi speech recognition on a plurality of speech recognizers in parallel. In the following the OCR procedure is described as one possible setup.

The conveyor belt keeps running transporting the object 6 to the camera 8. The camera 8 makes a digital image of the information area 14 and forwards the respective electronic signals to the OCR system 10. The OCR system 10 performs the OCR procedure 36 on the digital image using at least a part of the modified first ambiguous speech recognition result 24 for the OCR procedure. In more detail: The OCR system 10 determines if a character string processed by the OCR procedure 36 performed on the digital image corresponds to a candidate 26 in the candidate list, i.e., whether the OCR-processed address character string is found in the candidate list.

In the event that it is determined that the speech recognition candidate list does not contain a reasonable OCR-generated match to the scanned address element character string then the OCR system 10 continues to examine and attempt to resolve the address element versus all relevant address element data in a database 28 to resolve a sorting decision independent of the speech recognition candidate list. A controller 38 controls the processes.

If in another example—as depicted in FIG. 2—at least one of the candidates 26 requires further information for sorting, depicted with "N" in FIG. 4, a controller 38 of the processing system maintains the conveyor belt 4 with the object 6 stationary in front of the operator 2 in step 40 of the flow diagram in FIG. 4. This is depicted schematically in FIG. 2: The candidate 26, namely "68053" is not clear for sorting since the postal code 68053 is divided into two sorting areas.

In that case, the controller 38 requests 42 for more information. For this it triggers the artificial speaking of process information to the operator 2, such as the city name corresponding to that candidate 26 which needs further information. In the example of FIG. 2 this city name is "A-CITY." As soon as the operator hears specific processing information, such as a city name, he knows that this is request information. In step 44 the operator 2 checks this request information for consistency with the process information of the object 6 processed by him at that moment, i.e. the destination city of the address of the object in front of him, and provides a corresponding response.

If the city named in the request information is the destination city of the packet the operator 2 gives a positive response to the controller 38 via the speech recognition system 22. This response comprises process information, such as the street name in the address field of the packet. In the example of FIG. 2 the operator 2 reads "200 Main Street" into the microphone 18. In other embodiments any other response may be used, like pushing a respective button, for correct or incorrect for instance, or giving other information.

If the request information is not consistent with the process information, the operator gives a negative response. He may do so by dictating "negative" or performing any other suitable action.

The response is analyzed in a second speech recognition process 46 generating a second speech recognition result. This second result does not necessarily need to include a candidate list of streets. It should only be sufficient to decide, whether it is a negation or not. So, this second result is analyzed whether it is a negation or not (step 48). If it is no negation (direction "Y") it is processed as positive verification information resulting in the request information being assumed as correct. That means that the request information contained a correct character string of the object 6.

As a first consequence the first ambiguous speech recognition result 24 is modified by the controller 38 (step 50 in FIG. 4) according to the request information. In the example depicted in FIG. 2 the candidate "68310" is not a ZIP code belonging to A-City. Thus this candidate 26 is eliminated from the candidate list by the controller 38. The modified list may be passed to the OCR system 10 for supporting the OCR process 36. By this the first ambiguous speech recognition result 22 is modified to achieve consistency with the operator's response.

As a second consequence the search space for performing speech recognition for deriving the second ambiguous speech recognition result is reduced in step 52, so that only those elements or candidates being consistent with the request information remain in the search space. So according to FIG. 2 the search space originally comprising all street names, companies or other information in the U.S. (or the state) is reduced to only those street names, companies or other information present in A-City.

Then a second ambiguous speech recognition result 54 is generated in step 56. This contains candidates 58 as well, namely a list of street names, forming thus second purposely ambiguous data. This data may be used as additional data for the OCR process 36 and passed to the OCR system 10 for supporting the OCR process 36.

In another mode the second ambiguous speech recognition result 54 may be generated already in step 48, so that step 56 may be omitted. By this the search space for the second ambiguous speech recognition result 54 is large. However, the second ambiguous speech recognition result 54, like a candidate list, may be restricted afterwards by elimination of all candidates not consistent with the request information verified by the operator's utterance of information consistent with the requested information, i.e. verified by the operator by dictating verification information, which is the street name in this case. By this the verification step is performed after the voice recognition step.

There is the possibility that the candidate list is modified according to the third process information of the response. Any candidate not consistent with the second ambiguous speech recognition result, i.e. the street name in the example given, may be removed from the candidate list, probably rendering the candidate list unambiguous.

However, since the second ambiguous speech recognition result 54 is ambiguous information such a hard decision so early in processing is usually not desirable. If only speech recognition is used without OCR an elimination of candidates in one or the other list or both may be triggered based on respective reliability associated with candidates in ambiguous candidate lists 1 and 2 respectively, such as a very reliable street name candidate precludes a given ZIP code or a very reliable ZIP code candidate precludes a street name.

When using Hybrid Voice the second and modified first ambiguous speech recognition result may be passed to the OCR system 10 for performing the OCR procedure 36. The modified first ambiguous speech recognition result may be used to restrict the OCR search space. The second ambiguous speech recognition result may—if present—be used for the same purpose, and/or for affecting the reliability associated with candidates in ambiguous OCR results.

In the case that operator's response is a negation the result of speech recognition system analysis of operator's response (step 48) will be accordingly. This case is depicted in FIG. 3. The controller 38 initiates a modification 60 of the first ambiguous speech recognition result 24 which comprises a removal of the candidate corresponding to the request information. The candidate "68022" in FIG. 3 is an A-City ZIP code requiring further processing information. Accordingly the request information is "A-CITY." The packet in front of the operator 2, however, is addressed to "B-CITY." Consequently the operator's response is "negative", and the candidate "68022" is removed from the candidate list.

In the next step 62, the controller 38 checks whether any other candidate 26 needs further processing information. If this is so, a respective request 42 is started. In another mode the systems generated request information already in the first time coming to step 42 reflecting this need. So the operator would be prompted simultaneously with any ambiguous ZIP code in the list requiring further information. So the operator would hear for example "C-CITY or A-CITY," reflecting that an A-CITY ZIP code and a C-CITY ZIP needs further information.

If an operator, based on experience, realizes that a given utterance of a specific ZIP code or all ZIP code for a given city or other such circumstance results in a second information request, then the operator can in the initial utterance speak the ZIP code followed by the street if that is what the information request would necessitate. Alternatively this sequence that includes a self initiated second information may be proceeded by a keyword to avoid processing confusion.

If eventually all residual candidates 26 are adequate for sorting, the conveyor belt 4 is started in step 64, the object 6 is moved to the camera 8 and the OCR procedure 36 performed.

The invention claimed is:

1. A method of performing speech recognition on an object for automatic processing of the object by a processing system, wherein the object includes an information area containing a character string of processing information, the method comprising:
   acquiring a signal representing a sequence of characters spoken by an operator corresponding to the character string and processing the signal with a speech recognition processor by way of a speech recognition procedure generating a first ambiguous speech recognition result;
   based on specific characteristics of the first ambiguous speech recognition result, requesting additional processing information from the operator by providing request information with the processing system;
   acquiring a signal representing an operator's response to the request and processing the operator's response with the speech recognition processor for generating a second ambiguous speech recognition result;
   modifying the first ambiguous speech recognition result to achieve consistency with the operator's response; and
   making a digital image of the information area available for an optical character recognition (OCR) procedure and performing the OCR procedure on the digital image using at least a part of the modified ambiguous speech recognition result for the OCR procedure.

2. The method according to claim 1, wherein the first ambiguous speech recognition result is a candidate list with a plurality of candidates, at least one of the plurality of candidates corresponding to the character string.

3. The method according to claim 1, wherein a specific characteristics for requesting additional processing information is that at least a part of the first ambiguous speech recognition result is stored in a data memory of the processing system as data needing additional processing information.

4. The method according to claim 1, which comprises deriving the request information from the first ambiguous speech recognition result, the request information being different from the character string.

5. The method according to claim 1, wherein the request information contains processing information.

6. The method according to claim 1, which comprises processing the operator's response to generated a restricted vocabulary for speech recognition and generating the second ambiguous speech recognition result from the restricted vocabulary.

7. The method according to claim 1, wherein the operator's response is a further character string of the processing information of the object.

8. The method according to claim 1, wherein the character string is a ZIP code and the request information is a city name.

9. The method according to claim 8, wherein the request information corresponds to an element of the first ambiguous speech recognition result, the element being inconsistent with the character string.

10. The method according to claim 1, wherein the operator's response is a negation if the request information is not consistent with the processing information of the object.

11. The method according to claim 1, wherein the modifying step comprises removing an element of the first ambiguous speech recognition result.

12. The method according to claim 1, wherein, if the operator's response is a negation, the modifying step comprises removing from the first ambiguous speech recognition result a portion corresponding to the request information.

13. The method according to claim 1, wherein the modifying step comprises removing from the first ambiguous speech recognition result an element not consistent with the second ambiguous speech recognition result.

14. The method according to claim 1, which comprises:
   providing the request information to the operator as verification request for verifying the request information by giving verification information;
   processing the operator's response upon the request as processing information to generate a second ambiguous speech recognition result; and
   processing the verified request information as correct processing information.

15. A processing system for the automatic processing of an object, the object having an information area containing at least a character string of processing information, comprising:
- a speech recognition system having a port configured to be coupled to a communication device of an operator for inputting at least a sequence of characters, said speech recognition system being configured to generate a first ambiguous speech recognition result from an input received from the communication device;
- a controller connected to said speech recognition system, said controller being configured:
  - based on specific characteristics of the first ambiguous speech recognition result, to control a request for additional processing data by providing request information to the operator;
  - to control a processing of an operator's response to the request to generate a second ambiguous speech recognition result; and
  - to modify the first ambiguous speech recognition result to achieve consistency with the second ambiguous speech recognition result; and
- an optical character recognition (OCR) system connected to said controller and configured to recognize characters of the character string on the object using at least a part of the modified ambiguous speech recognition result.

* * * * *